(12) United States Patent
Ahmed et al.

(10) Patent No.: US 10,025,566 B1
(45) Date of Patent: Jul. 17, 2018

(54) SCHEDULING TECHNIQUE TO TRANSFORM DATAFLOW GRAPH INTO EFFICIENT SCHEDULE

(71) Applicant: The MathWorks, Inc., Natick, MA (US)

(72) Inventors: Masud Ahmed, Natick, MA (US); Paulo J. Pacheco, Westport, MA (US); Donald P. Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 15/288,367

(22) Filed: Oct. 7, 2016

(51) Int. Cl.
| | |
|---|---|
| *G06F 9/44* | (2006.01) |
| *G06F 9/45* | (2006.01) |
| *G06F 8/35* | (2018.01) |
| *G06F 8/41* | (2018.01) |
| *G06F 8/10* | (2018.01) |
| *G06F 8/20* | (2018.01) |
| *G06F 11/36* | (2006.01) |

(52) U.S. Cl.
CPC .............. *G06F 8/35* (2013.01); *G06F 8/41* (2013.01); *G06F 8/10* (2013.01); *G06F 8/20* (2013.01); *G06F 8/433* (2013.01); *G06F 11/3664* (2013.01)

(58) Field of Classification Search
CPC ..... G06F 8/10; G06F 8/20; G06F 8/24; G06F 11/3664; G06F 11/3688; G06F 11/3684; G06F 8/433; G06F 8/44
See application file for complete search history.

(56) References Cited

U.S. PATENT DOCUMENTS

| | | | |
|---|---|---|---|
| 8,046,202 | B1 * | 10/2011 | Yang .................. G06F 8/20 703/6 |
| 8,234,623 | B2 | 7/2012 | Orofino, II et al. |

(Continued)

OTHER PUBLICATIONS

O'Neil et al., "Transforming Synchronous Data-Flow Graphs to Reduce Execution Time", ISCA, IJCA, vol. 18, No., Jun. 2011, pp. 111-122; <http://www.cs.uakron.edu/~toneil/research/papers/journals/ijca11.pdf>.*

(Continued)

*Primary Examiner* — Thuy Dao
*Assistant Examiner* — Ben C Wang
(74) *Attorney, Agent, or Firm* — Cesari and McKenna, LLP.; Michael R. Reinemann

(57) ABSTRACT

Scheduling techniques transform dataflow graphs (DFGs), for example, of digital signal processing (DSP) arrangements of filters, into efficient schedules for concurrent execution on processing resources coupled to a memory. A DSP arrangement may be represented by an executable model having interconnected filters represented by model elements. The techniques may apply scheduling transforms according to a classification of the model elements based on a lifetime of their internal states (e.g., finite or infinite). Exemplary scheduling transforms may include unfolding, coordinated loop scheduling and pipelining to parallelize a DFG and enhance overall performance, i.e., reduce average sample execution time of the DSP arrangement. Notably, the scheduling transforms may aggregate (i.e., merge) multiple finite state model elements for concurrent execution and repeat execution of infinite state model elements to achieve the overall improved performance.

20 Claims, 7 Drawing Sheets

(56) References Cited

U.S. PATENT DOCUMENTS

| | | | | |
|---|---|---|---|---|
| 8,489,382 | B1 | 7/2013 | Koh | |
| 8,984,496 | B2 | 3/2015 | Devane et al. | |
| 9,720,743 | B2* | 8/2017 | Yu | G06F 9/52 |
| 2005/0097561 | A1* | 5/2005 | Schumacher | G06F 8/10 |
| | | | | 718/106 |
| 2010/0083185 | A1* | 4/2010 | Sakai | G06F 8/433 |
| | | | | 715/853 |
| 2010/0205588 | A1* | 8/2010 | Yu | G06F 8/456 |
| | | | | 717/149 |
| 2011/0276789 | A1* | 11/2011 | Chambers | G06F 9/3885 |
| | | | | 712/220 |
| 2013/0080993 | A1* | 3/2013 | Stravers | G06F 8/433 |
| | | | | 717/104 |
| 2014/0380266 | A1* | 12/2014 | Bornhoevd | G06F 8/20 |
| | | | | 717/104 |
| 2015/0160927 | A1* | 6/2015 | Stevens | G06F 8/34 |
| | | | | 717/105 |
| 2016/0062736 | A1* | 3/2016 | Stanfill | G06F 8/10 |
| | | | | 717/105 |
| 2016/0062747 | A1* | 3/2016 | Stanfill | G06F 8/41 |
| | | | | 717/144 |
| 2016/0062776 | A1* | 3/2016 | Stanfill | G06F 8/43 |
| | | | | 719/331 |
| 2016/0269276 | A1* | 9/2016 | Gyselinck | H04L 45/18 |
| 2016/0291942 | A1* | 10/2016 | Hutchison | G06F 8/451 |
| 2017/0249567 | A1* | 8/2017 | Chambers | G06F 9/44 |
| 2017/0277521 | A1* | 9/2017 | Sharma | G06F 8/35 |
| 2017/0351493 | A1* | 12/2017 | Kintali | G06F 8/20 |
| 2017/0371721 | A1* | 12/2017 | Yu | G06F 8/456 |
| 2018/0081919 | A1* | 3/2018 | Stanfill | G06F 8/456 |

OTHER PUBLICATIONS

Hsu et al., "Multithreaded Simulation for Synchronous Dataflow Graphs", ACM, vol. 16, No. 3, Article 25, Jun. 2011, pp. 25:1-23; <https://dl.acm.org/citation.cfm?id=1970358&CFID=1010142667&CFTOKEN=63671704>.*

Prihozhy et al., "Synthesis and Optimization of Pipelines for HW Implementations of Dataflow Programs", IEEE, vol. 34, No. 10, Oct. 2015, pp. 1613-1626; <http://ieeexplore.ieee.org/stamp/stamp.jsp?tp=&arnumber=7097015>.*

Abdolrashidi et al., "Wireframe: Supporting Data-dependent Parallelism through Dependency Graph Execution in GPUs", ACM, MICRO-60, Oct. 2017, pp. 600-611; <https://dl.acm.org/citation.cfm?id=3123976>.*

Narayan et al., "From Traces to Proofs: Proving Concurrent Programs Safe", IEEE, Jul. 2016, pp. 152-159; <http://ieeexplore.ieee.org/stamp/stamp.jsp?tp=&arnumber=7541900>.*

Tendulkar et al., "Strictly Periodic Scheduling of Acyclic Synchronous Dataflow Graphs using Smt Solvers", Verimag Research Report, TR-2014-5, May 2014, pp. 1-19; <http://www-verimag.imag.fr/TR/TR-2014-5.pdf>.*

Cordes, Daniel, et al., "Automatic Extraction of Pipeline Parallelism for Embedded Software Using Linear Programming," IEEE Computer Society, 2011 IEEE 17th International Conference on Parallel and Distributed Systems, Dec. 7-9, 2011, pp. 699-706.

Gordon, Michael I., et al., "Exploiting Coarse-Grained Task, Data, and Pipeline Parallelism in Stream Programs," ACM, ASPLOS'06, San Jose, CA, Oct. 21-25, 2006, pp. 151-162.

Jeng, Lih-Gwo, et al., "Rate-Optimal Dsp Synthesis by Pipeline and Minimum Unfolding," IEEE Transactions on Very Large Scale Integration (VLSI)Systems, vol. 2, No. 1, Mar. 1994, pp. 81-88.

Lucke, Lori E., et al., "Unfolding and Retiming for High-Level DSP Synthesis," IEEE, Proceedings - IEEE International Symposium on Circuits and Systems Part 4 (of 5), Singapore, Singapore, Jun. 11-14, 1991, pp. 2351-2354.

Schaumont, P. R., "Chapter 2: Data Flow Modeling and Transformation,"*A Practical Introduction to Hardware/Software Codesign*, Springer Science+Business Media, New York, Hardcover, 2013, pp. 31-59.

Tournavitis, Georgios, et al., "Semi-Automatic Extraction and Exploitation of Hierarchical Pipeline Parallelism Using Profiling Information," ACM, PACT'10, Vienna, Austria, Sep. 11-15, 2010, pp. 377-388.

* cited by examiner

SCHEDULING TECHNIQUE TO TRANSFORM DATAFLOW GRAPH INTO EFFICIENT SCHEDULE

BRIEF DESCRIPTION OF THE DRAWINGS

Advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
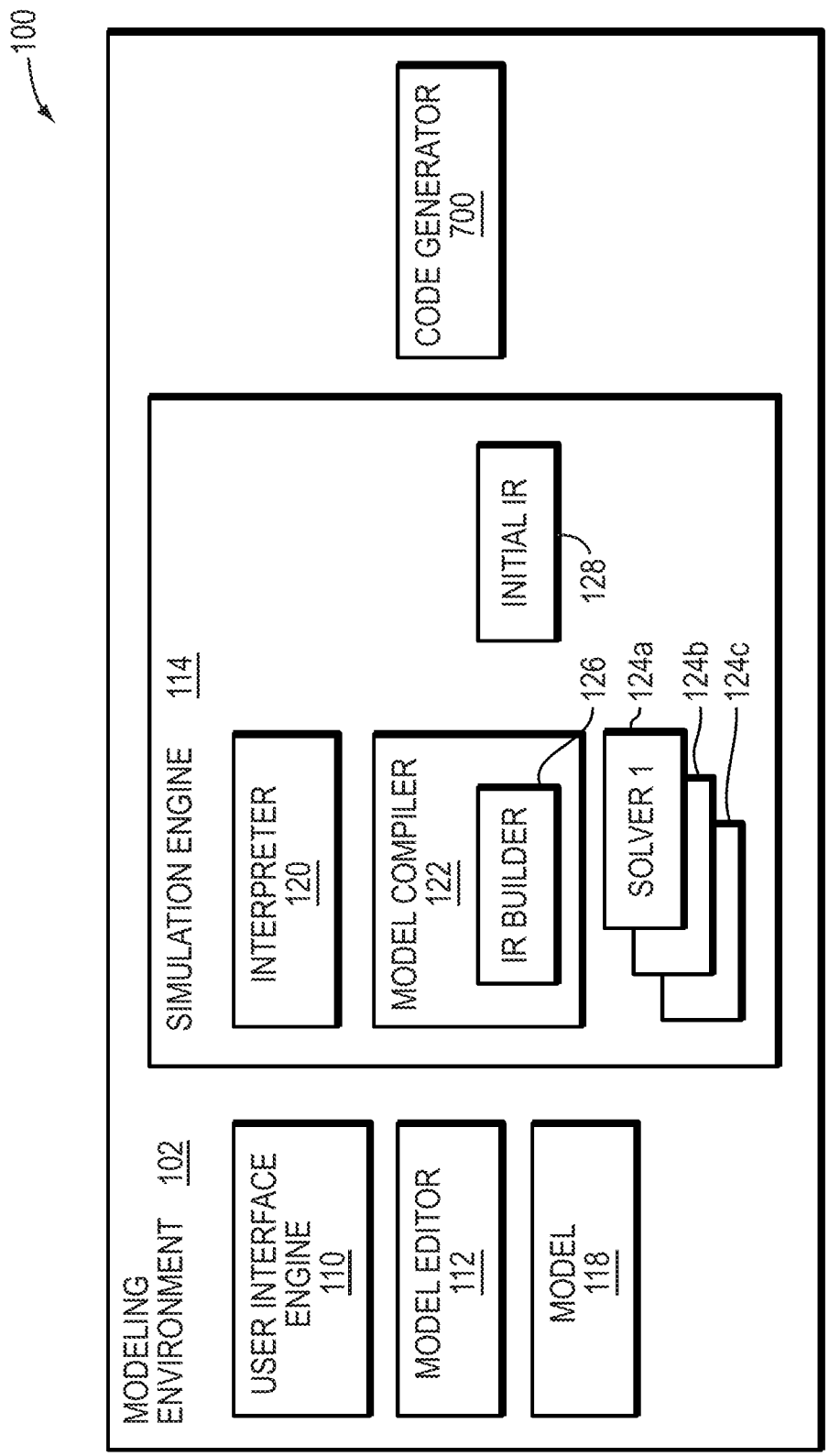
FIG. 1 is a schematic diagram of a development and optimization system according to one or more embodiments.

Embodiments described herein are directed toward scheduling techniques that transform dataflow graphs, for example, of digital signal processing (DSP) arrangements of filters, into efficient schedules. The schedules may be suitable for concurrent execution on processing resources coupled to a memory. A DSP arrangement may be represented by an executable model having interconnected filters represented by model elements. A modeling environment may include a simulation engine and a code generator, each of which may generate an initial representation of the executable model. The initial representation may be an initial intermediate representation (IR) in the form of a dataflow graph (DFG), wherein a plurality of nodes represent the model elements and edges represent connections among the model elements. The simulation engine and/or code generator may subject the initial IR to a plurality of scheduling transforms resulting in the creation of a final IR having a greater efficiency for concurrent execution. Exemplary scheduling transforms may include unfolding, loop scheduling, and pipelining to parallelize the DFG and enhance overall performance (e.g., reduce an average sample execution time of the DSP arrangements of filters operating on samples of input data). The scheduling transforms may aggregate (e.g., combine) multiple finite state model elements for concurrent execution, and repeat execution of infinite state model elements to achieve the overall improved performance.

In some embodiments, the techniques may classify nodes of the DFG based on a lifetime (e.g., duration) of their internal states: finite duration and infinite duration states. For example, a node having a state length (e.g., duration) L indicates that the node has a capacity (e.g., memory) of L states such that after L step/iteration/calls operating on input data, the node returns to a previous state. For example, the finite state node may be said to "remember" (retain) L−1 past samples (e.g., samples of the input data to the node). Illustratively, a node having a finite (known) state length, such as a finite impulse response (FIR) filter node, may be classified as a finite state node, and a node having an unknown state length, such as an infinite impulse response (IIR) filter node, may be classified as an infinite state node. Further, a stateless node (e.g., FFT) may be classified as a finite state node (having a state length of zero) and an unspecified stateful node (e.g., not having a specific state length) may be classified as an infinite state node. Finite state nodes may be replicated (e.g., unfoldable) during concurrent execution, but infinite state nodes may not be replicated (e.g., not unfoldable), for example so as to ensure numerical correctness. A node having a single instance because of, e.g., a singleton requirement due to resource scarcity or synchronization, may be also classified as an infinite state node to restrict replication.

In some embodiments, the techniques may employ unfolding as a transformation of the DFG that parallelizes the DFG with respect to a finite state node or a set of nodes that consume a majority of the arrangement's total execution time, i.e., tall-pole node(s). Illustratively, unfolding replicates the set of tall-pole nodes (e.g., unfoldable finite state nodes) in different threads of execution (threads) of the processing resources to increase throughput of the arrangement as a whole. The techniques may allow replication of the unfoldable (tall-pole) nodes up to a number of threads specified by an unfolding factor (uf). The techniques may also employ loop-scheduling as a transformation to create a "loop schedule" around each infinite state node with an iteration count equal to the uf, such that a step of execution (e.g., an execution frame) includes the unfoldable finite state nodes and the loop-scheduled infinite state nodes. As used herein, an execution frame may be a pattern of node execution across the processing resources that repeats with each frame, wherein nodes within the frame may operate sequentially and concurrently on different input samples. In this manner, average per sample execution time (e.g., latency) may be substantially decreased for the unfoldable tall-poles. The techniques may then further employ pipelining as a transformation to increase the throughput of the DFG at the possible cost of increased latency (e.g., throughput may trade-off latency).

Notably, the scheduling techniques may create a static execution schedule wherein each node may be statically assigned to a thread (e.g., nodes may not migrate among the threads). For example, the techniques may produce a static schedule which may restrict execution of each node to a single thread. In some embodiments, the static schedule may be a synchronous schedule wherein the nodes are executed across the threads synchronously per frame, which may trade-off latency for a higher throughput. In other embodiments, the static schedule may be an asynchronous schedule wherein the nodes may execute asynchronously as results are available, which may trade-off throughput to yield a lower latency.

Development and Optimization System

FIG. 1 is a schematic diagram of the development and optimization system 100. The system 100 may include a modeling environment 102 that may include user interface (UI) engine 110, a model editor 112, a simulation engine 114, and a code generator 700. The UI engine 110 may create and present one or more User Interfaces (UIs), such as Graphical User Interfaces (GUIs) and/or Command Line Interfaces (CLIs), on one or more display devices coupled to a computer processing device, such as a target system or data processing system. The one or more GUIs and/or CLIs may be operated by users to perform various modeling tasks, such as opening, creating, and saving models, such as an executable graphical (source) model 118. The GUIs and/or CLIs may also be used to enter commands, set values for parameters and properties, run models, change model settings, etc. The model editor 112 may perform selected operations, such as open, create, edit, and save, in response to user inputs.

The simulation engine 114 may include an interpreter 120, a model compiler 122, and one or more solvers, such as solvers 124*a-c*. The model compiler 120 may include one or more Intermediate Representation (IR) builders, such as IR builder 126. The simulation engine 114 may generate execution instructions for the model 118, and may execute, e.g., compile and run or interpret, the model 118 using one or more of the solvers 124*a-c*. Exemplary solvers include one or more fixed-step continuous solvers, which may utilize integration techniques based on Euler's Method or Heun's Method, and one or more variable-step solvers, which may be based on the Runge-Kutta and Dormand-Prince pair.

The IR builder 126 may construct one or more in-memory representations or IRs from the model 126. In an embodiment, the IR builder 126 may construct an initial IR 128 that closely corresponds to the model 118. For example, the structure of the initial IR 128 may closely correspond to the structure of the model 118, and the model editor 112 may utilize the initial IR 128 to prepare a visual representation of the model 118 directly (e.g., without having to perform extensive manipulations or transformations to the initial IR 128).

In some embodiments, the modeling environment 102 is a high-level modeling environment. Suitable high-level modeling environments include the MATLAB® algorithm development environment and the Simulink® model-based design environment from The MathWorks, Inc. of Natick, Mass., as well as the Simscape™ physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, Tex., the Visual Engineering Environment (VEE) product from Agilent Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Models created in the high-level modeling environment may contain less implementation detail, and thus operate at a higher level than certain programming languages, such as the C, C++, C#, and System C programming languages.

Those skilled in the art will understand that the MATLAB® algorithm development environment is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In another embodiment, a lower level programming language, such as the C, C++, C#, and System C programming languages, among others, may be used to create one or more models.

Models constructed within the modeling environment 102 may include textual models, graphical models, such as block diagrams, and combinations of graphical and textual models. A given model may simulate, e.g., approximate the operation of, a system. Exemplary systems include weather systems, financial markets, plants, controllers, etc. A model may be executed in order to simulate the system being modeled, and the execution of a model may be referred to as simulating the model. For example, a GUI generated by the UI engine 110 and presented on a display of a computer processing device may include a Run command that may be selected by a user to execute the model 118. Alternatively, a user may enter a run command in a CLI generated by the UI engine 110. In response to the user selecting the Run button or entering the run command, the simulation engine 114 may execute the model 118, and may present the results of the model's execution to the user, e.g., on the display.

A model may be executed over a simulation time that starts at a simulation start time and ends at a simulation end time, for example from zero to ten seconds. States and outputs defined by model elements and other values may be computed at successive points in time between the simulation start and end times. These points in time may be referred to as sample times and the time interval between consecutive sample times may be referred to as the sampling period. The size of the sampling period may be fixed or variable as determined by a particular solver used by the simulation engine. It should be understood that simulation time may differ from actual clock time. For example, even though a model's execution may be simulated from zero to ten seconds, it may take a small fraction of actual clock time for a data processing system to execute the model over that simulation time. A model's simulation time, including the units of time, may be altered by a user, and in some embodiments no simulation end time may be specified for a model.

The GUI generated by the UI engine 110 also may include a code generation command that may be selected by the user. Alternatively, the user may enter a code generation command in the CLI. In response to the user selecting a code generation button or entering the code generation command, the code generator 700 may generate code for at least part of the model 118.

Data Processing System

Figure 2:
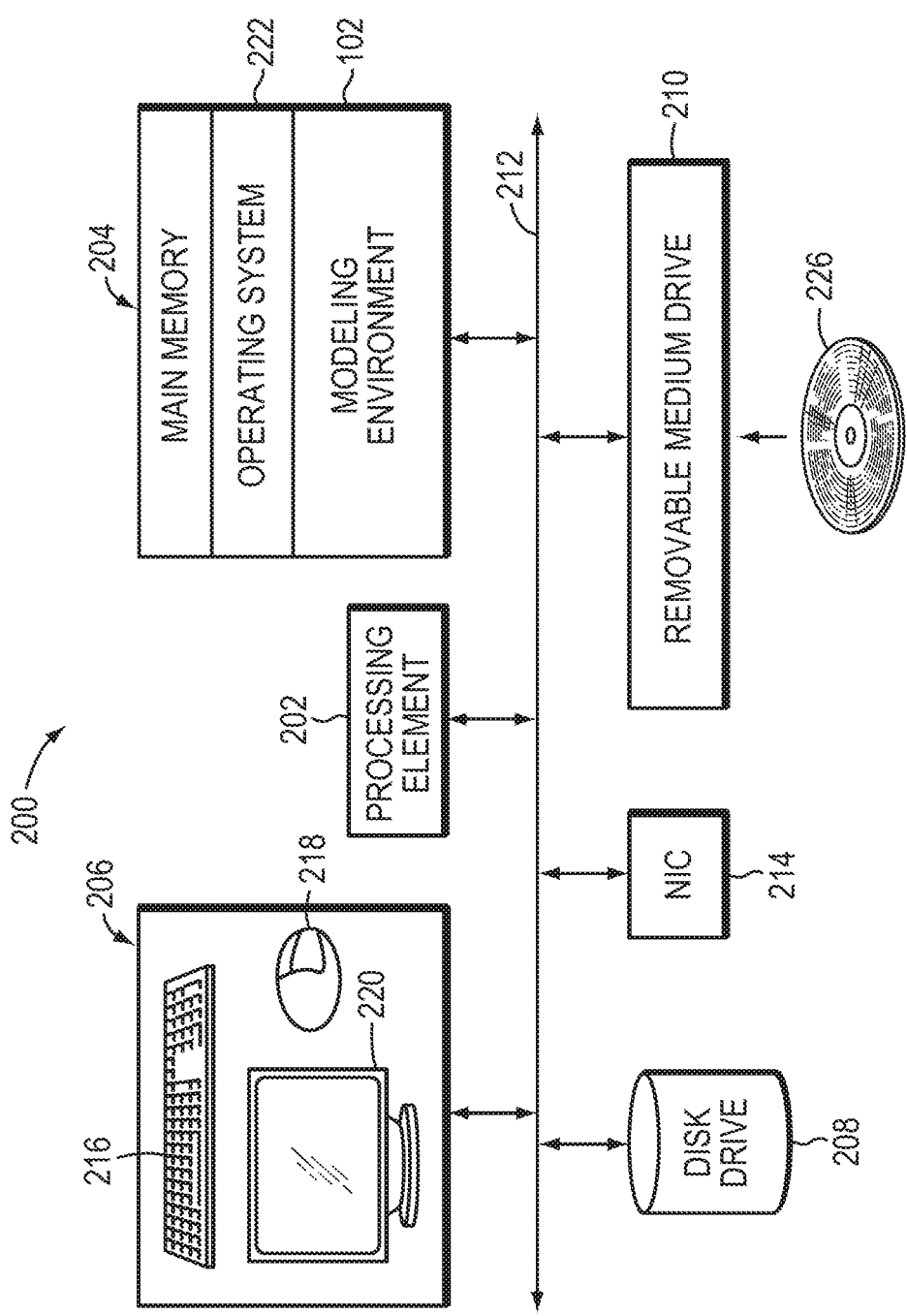
FIG. 2 is a schematic diagram of a data processing system according to one or more embodiments.

FIG. 2 is a schematic diagram of a data processing system 200 for implementing the modeling environment in accordance with one or more embodiments described herein. The data processing system 200 may be embodied as a computer, and may include one or more processing elements, such as processing elements 202, a main memory 204, user input/output (I/O) 206, a persistent data storage unit, such as a disk drive 208, and a removable medium drive 210 that are interconnected by a system bus 212. The system 200 may also include a communication unit, such as a network interface card (NIC) 214. The user I/O 206 may include a keyboard 216, a pointing device, such as a mouse 218, and a display 220. Other user I/O 206 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 204, which may be a Random Access Memory (RAM), may include memory locations that are addressable by the processing elements 202 for storing software programs and data structures associated with the embodiments described herein. Exemplary software programs may include a plurality of program libraries or modules, such as an operating system 222, and one or more application programs that interface to the operating system 222, such as the modeling environment 102. The processing elements 202, e.g., microprocessors, may include processing cores configured to execute the software programs, such as model 118 of modeling environment 102, and manipulate the data structures. The model may be executed, e.g., in response to the Run command selected by the user, in order to simulate the DSP arrangement being modeled. Illustratively, the model 118 may be implemented as a set of processes that may be decomposed into a plurality of threads and which are mapped to the processor cores for concurrent execution to achieve the overall improved performance of the computer or data processing system 200 in accordance with the embodiments described herein.

The removable medium drive 210 may accept and read a computer readable medium 226, such as a CD, DVD, floppy disk, solid state drive, tape, flash memory or other non-transitory medium. The removable medium drive 210 may also write to the computer readable medium 226.

Suitable computer systems include personal computers (PCs), workstations, servers, laptops, tablets, palm computers, smart phones, electronic readers, and other portable computing devices, etc. Nonetheless, those skilled in the art will understand that the computer system 200 of FIG. 2 is intended for illustrative purposes only, and that the embodiments herein may be used with other computer systems, data processing systems, or computational devices. The embodiments may also be used in a networked, e.g., client-server, computer architecture, or a public and/or private cloud computing arrangement. For example, the modeling environment application 102 may be hosted on a server, and accessed by a remote client through an application hosting system, such as the Remote Desktop Connection tool from Microsoft Corp.

Suitable operating systems 222 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 222 may provide services or functions for other modules, such as allocating memory, organizing data according to a file system, prioritizing requests, etc. The operating system 222 may run on a virtual machine, which may be provided by the data processing system 200.

As indicated above, a user or developer, such as an engineer, scientist, programmer, etc., may utilize one or more input devices, such as the keyboard 216, the mouse 218, and the display 220 to operate the modeling environment 102, and construct one or more models, such as graphical models having executable semantics. In particular, the model may provide one or more of time-based, event-based, state-based, frequency-based, control-flow based, and dataflow-based execution semantics. The execution of a model may simulate operation of the system that is being designed or evaluated. The term graphical model, moreover, is intended to include graphical program.

Dataflow Transformation

Embodiments described herein are directed toward scheduling techniques that transform dataflow graphs, for example of digital signal processing (DSP) arrangements of filters, into efficient schedules. However, it should be understood by persons of skill in the art that the scheduling techniques described herein may apply to non-DSP applications such as, among others, computer vision and communications. The schedules may be suitable for concurrent execution on processing resources coupled to a memory. As noted, the DSP arrangement may be represented by an executable model having interconnected filters represented by model elements. Simulation engine 114 and code generator 700 of modeling environment 102 may each generate an initial representation of the executable model, such as an initial intermediate representation (IR) 128 in the form of a dataflow graph, wherein a plurality of nodes represent the model elements and edges represent connections (e.g., data dependency) among the elements.

Figure 3:
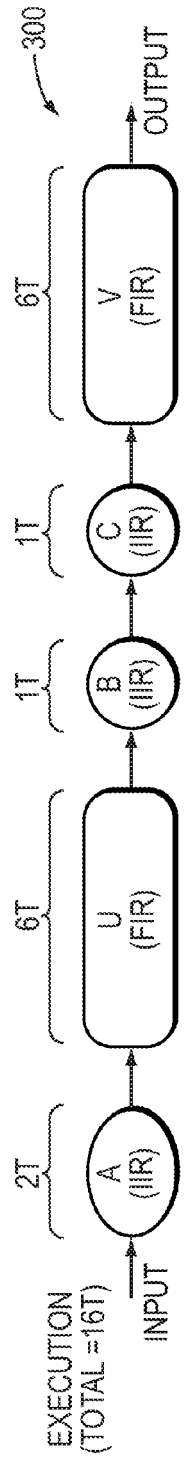
FIG. 3 is an exemplary dataflow graph of a digital signal processing arrangement.

FIG. 3 is an exemplary dataflow graph of the digital signal processing (DSP) arrangement. Illustratively, the dataflow graph (DFG) 300 (e.g., the initial IR 128) includes finite state nodes (e.g., finite impulse response (FIR) filters), U and V, as well as infinite state nodes (e.g., infinite impulse response (IIR) filters), A, B and C, which may be arranged in sequential fashion to process inputs and yield outputs for a given sampling period T. An execution time of each node may be expressed proportional to the sampling period. For example, as indicated in FIG. 3, IIR filter A may have an execution time of 2T, FIR filter U may have an execution time of 6T, and so on. Accordingly, the DSP arrangement represented by the DFG 300 may have a total execution time of 16 T.

Figure 4:
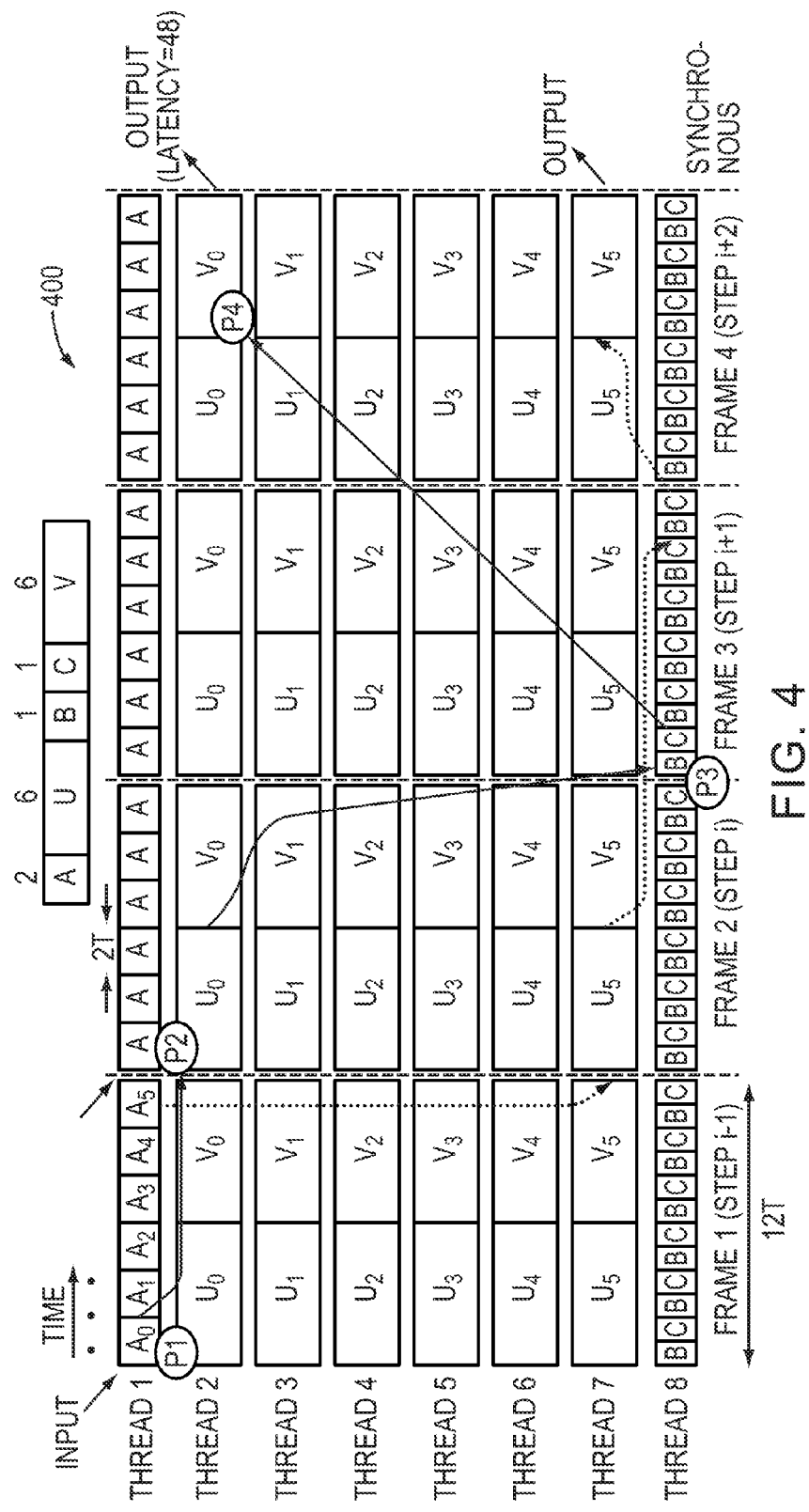
FIG. 4 is a diagram of a synchronous schedule of the dataflow graph according to a scheduling technique.

FIG. 4 is a diagram of a synchronous schedule 400 of the dataflow graph (e.g., graph 300) according to a scheduling technique. The scheduling technique may sequentially loop infinite state nodes A, B, C (FIG. 3) so that the internal states for each node may be preserved, and may apply unfolding (i.e., replication) to stateless or finite state length nodes U and V to create a synchronous schedule. The schedule may be arranged in frames 1-4 of sample periods 12T, synchronized across the processing resources, where an output of a node in a frame 1 feeds the input of a dependent node in a next frame 2 according to the DFG 300. For example, the loop-scheduled and unfolded portions of the synchronous schedule 400 may transfer data among the nodes using pipelining registers. For example, the technique may rearrange (i.e., transform) the DFG 300 into branches of pipelined nodes based on node classification, and schedule the nodes in the respective branches for concurrent execution by the processing resources, e.g., threads 1-8. The technique may transform the DFG into parallel branches to be mapped to an available number of threads. The schedule for concurrent execution of the nodes may produce a result equivalent to that as a sequential scheduling of the DSP arrangement.

In some embodiments, no branch of the transformed DFG may have a size (e.g., state length) exceeding that of a longest node (tallest pole) in the DSP arrangement. Accordingly, the schedule produced by the technique may be expressed as a pipeline from frame 1 to frame 2 on per thread basis. The frames may correspond to pipeline stages. Each loop-scheduled node (e.g., node A) within a frame may operate on a different sample within a thread, e.g., node $A_0$ operates on a sample in thread 1 and node $A_1$ operates on another sample in thread 1. In contrast, the unfoldable replicated nodes (e.g., nodes U and V) operate on different samples across the threads, e.g., node $U_0$ executing in thread 2 operates on a different sample from that of node $U_1$ executing in thread 3. As such, node $A_0$ in frame 1 feeds node $U_0$ in frame 2, which, in turn, feeds nodes $B_0$ and $C_0$ in frame 3, which finally feeds node $V_0$ in frame 4 that yields the output of the DSP arrangement.

The schedule 400 may be created by calculating a frame size based on the unfolding factor (uf) applied in aggregate. That is, the finite state branches (i.e., the unfoldable nodes) of the transformed DFG may be aggregated into a frame. Similarly, the infinite state branches (i.e., non-unfoldable nodes) of the transformed DFG may also be aggregated within the frame. Illustratively, a number of copies (e.g., loop-schedules) equal to the uf for the nodes in each infinite node branch may be created for the frame. For example, assume that "I∈S" is a set of nodes with infinite state (e.g., nodes A, B and C), where "S" is a set of all nodes {A, B, C, U, V} in the DFG 300. "F" is a set of all other nodes except "I" (e.g., U and V), which may be regarded as finite state nodes (i.e., non-infinite state nodes). Thus, in this example, I={A, B, C} and F={U, V}. In an embodiment, the unfolding factor uf may be calculated as the ratio of a sum of the execution times of all the finite state (e.g., non-infinite state) nodes over the execution time of the infinite state node having a maximum execution time among all the infinite state nodes:

$$\text{unfolding factor}(uf) = \frac{\sum_{\partial \in F} \text{exec\_time}(\partial)}{\max\{\text{exec\_time}(\partial) \mid \partial \in I\}}$$

The techniques may transform the DFG into branches based on node classification (e.g., finite state nodes and infinite state nodes) and may create a pipeline stage around each unfoldable node (stateless or with finite state length). Pipeline stages that contain unfoldable nodes may be then merged, and the merged set may be replicated to "uf" number of threads. Nodes with infinite state (i.e., A, B, C) may not be replicated, and instead may be looped to produce necessary input to the unfolded nodes.

As noted, the DFG 300 may have a total execution time (sequential) of 16T, wherein U and V consume 6 units of execution time each (together 75% of the total execution) and wherein A, B, and C consume 2, 1, and 1 units of execution time, respectively. For this DSP arrangement, the unfolding factor is thus 12/2 equals to 6:

$$\frac{6T \text{ (node } U) + 6T \text{ (node } V)}{2T \text{ (node A having greatest length of infinite state nodes)}}$$

The techniques may create 4 pipeline stages (one per frame): P1, P2, P3, and P4 (e.g., before U, after U, before V, and finally after V), wherein pipeline stage P1 contains A, pipeline stage P2 contains U, pipeline stage P3 contains B and C, and pipeline stage P4 contains V. Pipeline stages P2 and P4 may be sequentially executed one after another (merged), and may be replicated in 6 (i.e., unfolding factor) different threads. For example, pipeline stage P1 may be looped 6 times upon thread 1, and pipeline stage P3 is looped 6 times upon thread 8. In some embodiments, the technique may merge pipeline stages P1 and P3 if they could finish within the total execution time of the unfoldable nodes. Pipeline registers (not shown) may be used to store data from a previous step, so at every dataflow frame (i.e., step i) all required data are coming (received) from an adjacent previous step i–1, which are readily available in the pipeline register.

A per sample average execution time (e.g., throughput) for the synchronous schedule may be determined from the number of processed samples output per frame. Thus, for the above example, the average execution time is 12T/6=2T, yielding a speedup (a ratio of sequential execution time to parallel execution time) of 16T/2T equals 8 (based on thread utilization of 100%). The synchronous scheduling techniques may trade off latency (16T for sequential scheduling vs. 48T for synchronous scheduling) for speedup (8 times).

Figure 5:
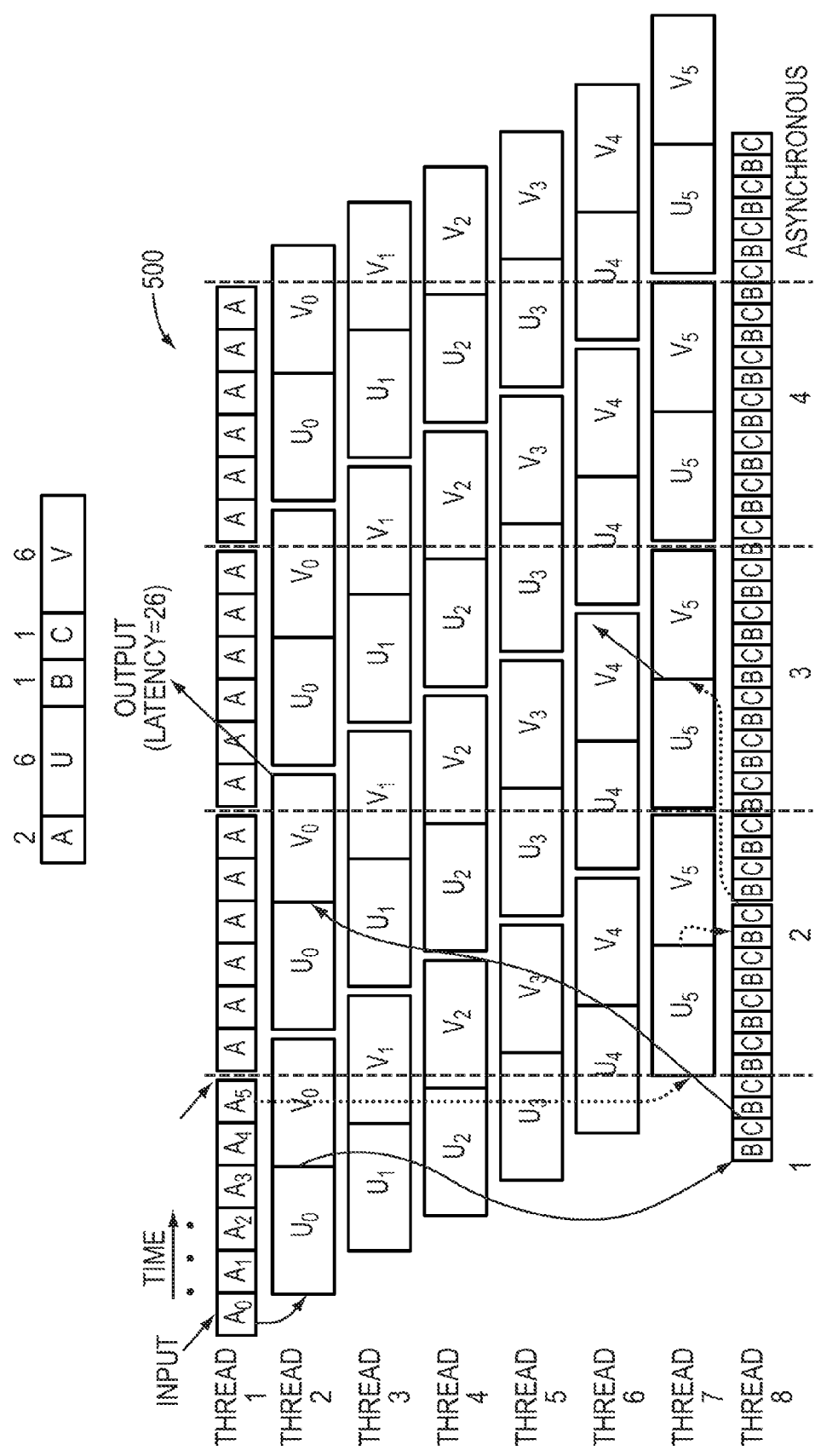
FIG. 5 is a diagram of an asynchronous schedule of the dataflow graph according to a scheduling technique.

In some embodiments, the static schedule may be an asynchronous schedule wherein the nodes are executed asynchronously as results are available, which trades off throughput to yield a lower latency. In these embodiments, latency may be reduced with respect to the synchronous schedule 400 by potentially trading off speedup. FIG. 5 is a diagram of an asynchronous schedule 500 of the dataflow graph 300 (FIG. 3) according to a scheduling technique. In these embodiments, the notion of synchronizing execution of the nodes across the threads by frames may be discarded in favor of executing an unfoldable node as soon as results from a previous node are available, thereby reducing the overall latency. In addition, the infinite state nodes A, B and C may not be loop-scheduled. For example, the node $A_0$ feeds node $U_0$ which, in turn, feeds nodes $B_0$ and $C_0$ all within frame 1 and finally feeds node $V_0$ to yield the output with a latency of 26T. However, the processing resources may not be fully utilized as compared with the synchronous schedule, which may result in a lower throughput.

Figure 6:
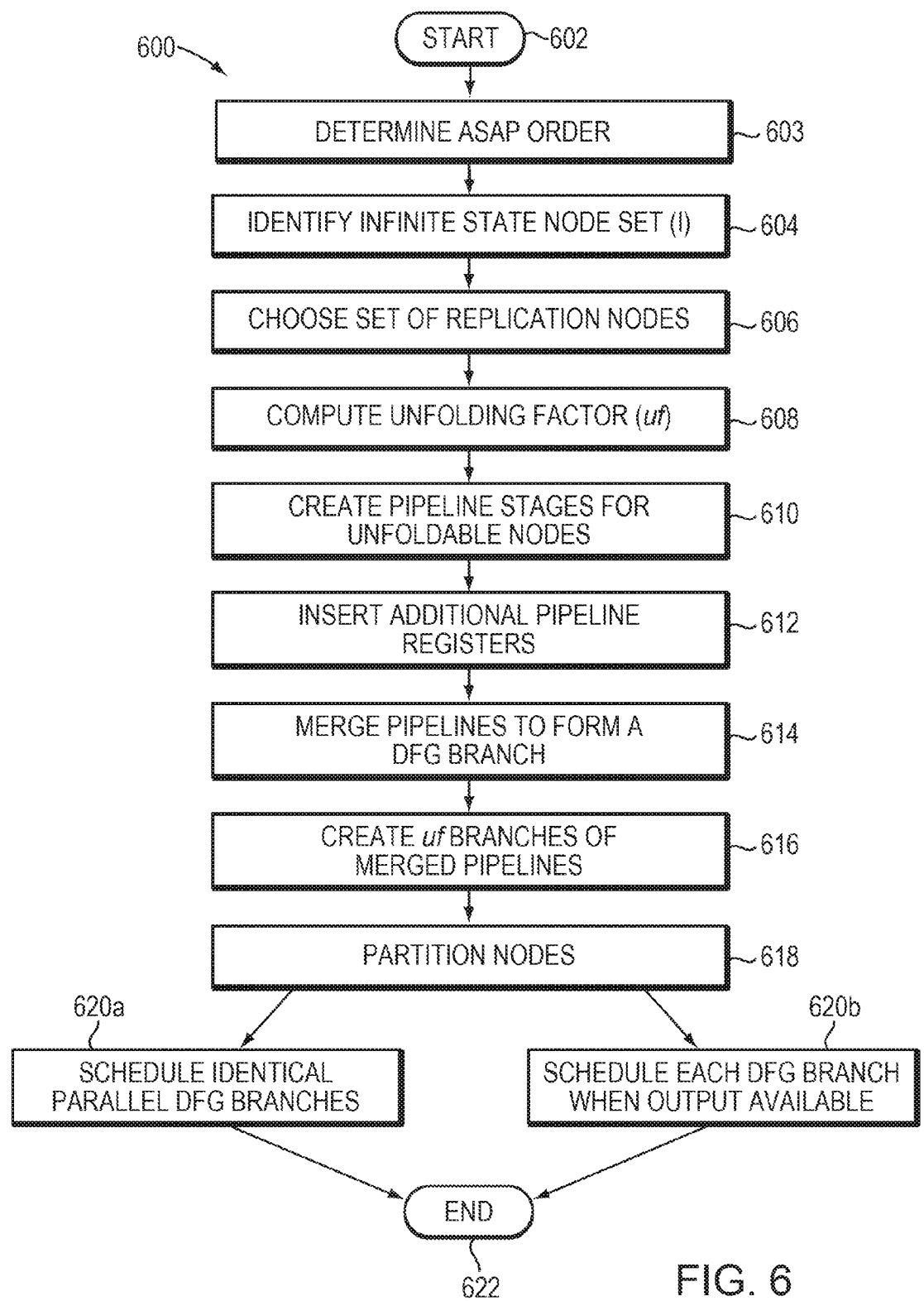
FIG. 6 is a flowchart of a procedure for producing synchronous and asynchronous schedules according to a scheduling technique.

FIG. 6 is flowchart of a procedure for producing synchronous and asynchronous schedules according to a scheduling technique. Illustratively, the procedure 600 starts at step 602 and proceeds to step 603 where a determination is rendered as to an as-soon-as-possible (ASAP) order (e.g., a schedule where every node is executed as early in time as possible) of the DFG for a set S of all the nodes wherein, each node may be executed whenever input is available to support asynchronous schedules. The set S may then be classified into finite state nodes (including nodes with zero states) and infinite state nodes in two steps: step 604 where an infinite state node set I is identified from the given node set S (e.g., I={A,B,C}); and step 606 where a search (e.g., a binary search) is employed to choose a set of nodes F from the node set S (i.e., F∈S) for replication based on performance constraints (e.g., processing resources such as threads). The nodes in F may be unfoldable nodes of finite length state (e.g., F={U,V}). For example, the finite state nodes may be determined by eliminating the infinite state nodes, thus leaving a remaining set of unfoldable nodes, F, each having finite states. At step 608, an unfolding factor (uf) is determined by computing the ratio:

$$\frac{\sum_{\partial \in F} \text{exec\_time}(\partial)}{\max\{\text{exec\_time}(\partial) \mid \partial \in I\}},$$

where F and I are the sets of finite (F) and infinite (I) state nodes, respectively, as determined in steps 604 and 606.

At step 610, a schedule may be created having unfoldable nodes F as pipeline stages, such that each pipeline stage contains a single unfoldable node (e.g., from the set of unfoldable nodes, F) and the length of each pipeline stage does not exceed the longest non-unfoldable (e.g., finite state) node ($T_R$=max{exec_time($\theta$)|$\theta \in I$}). At step 612, additional pipeline registers may be inserted to coordinate results between loop scheduled nodes and the unfoldable nodes so as to ensure correct numerical results. At step 614, the pipeline stages of the unfoldable nodes may be merged to create an unfoldable stage $I_B$ (e.g., representing a parallel branch in the DFG). At step 616, uf copies are created of the unfoldable stage $I_B$, wherein each copy is assigned to a single thread (e.g., the finite state node branches may be replicated based on constraints of processing resources, such as parallel threads).

At step 618, nodes may be partitioned (e.g., apportioned among the threads) such that threads having finite state nodes (F) do not exceed the total execution time $T_R$ without counting looping for synchronous schedules. The procedure then proceeds to the production of either a synchronous schedule at 620a, where a replica is created for each stateful node (F) in each parallel branch (e.g., the uf copies of unfoldable stage $I_B$) or an asynchronous schedule at step 620b, where each unfoldable stage is started whenever input (results from a prior stage) is available from a previous step. As noted, a synchronous schedule may be produced for greater throughput, whereas an asynchronous schedule may be produced for lower latency. The procedure then ends at step 622.

Advantageously, the techniques may increase the computational parallelism of the DFG using a combination of unfolding and loop scheduling based on pipelining to address a case where the DFG contains a set of unfoldable tall-pole nodes. That is, scheduling is coordinated between parallel branches of the DFG having unfoldable nodes and other parallel branches having loop scheduled nodes. The techniques may replicate across processing resources the set of tall-pole nodes with finite state; nodes with infinite state may not be replicated, but instead may be looped to provide necessary input to the tall-pole nodes. The techniques may reduce average per frame execution time (i.e., latency) substantially in the case of unfoldable tall-poles. The techniques produce a static schedule which may restrict execution of each node upon a single thread (no task/node migration). The techniques replicate all unfoldable nodes together (e.g., aggregated unfolding) to substantially increase speedup (throughput).

A DFG may be embodied as (1) a homogeneous synchronous dataflow graph or (2) a heterogeneous dataflow graph. Illustratively, DFG 300 represents a homogenous DFG in which each node reads an input sample from an input edge (typically modelled as an input FIFO queue) and writes an output sample on an output edge (modelled as an output FIFO queue). For a heterogeneous DFG (not shown), consumption of input samples from an input FIFO queue and production of output samples to an output FIFO are illustratively defined by corresponding production and consumption rates which may differ (i.e., a multi-rate DFG). That is, the multi-rate DFG may have different input/output sampling rates. The above techniques (i.e., aggregated unfolding coordinated by loop-scheduling and pipelining in procedure 600) may be applied to heterogeneous DFG embodiments in which the iteration count is a function of production and consumption rates including an unfolding factor.

Moreover, the above techniques may apply to static scheduling of dataflows in which nodes are a priori enabled or disabled in the dataflow. However, the techniques may also apply to quasi-static scheduling of boolean or dynamic dataflows in which separate control inputs may enable or disable nodes in the dataflow, wherein a disabled node may be replaced by an identity node that passes through samples.

Code Generator

Figure 7:
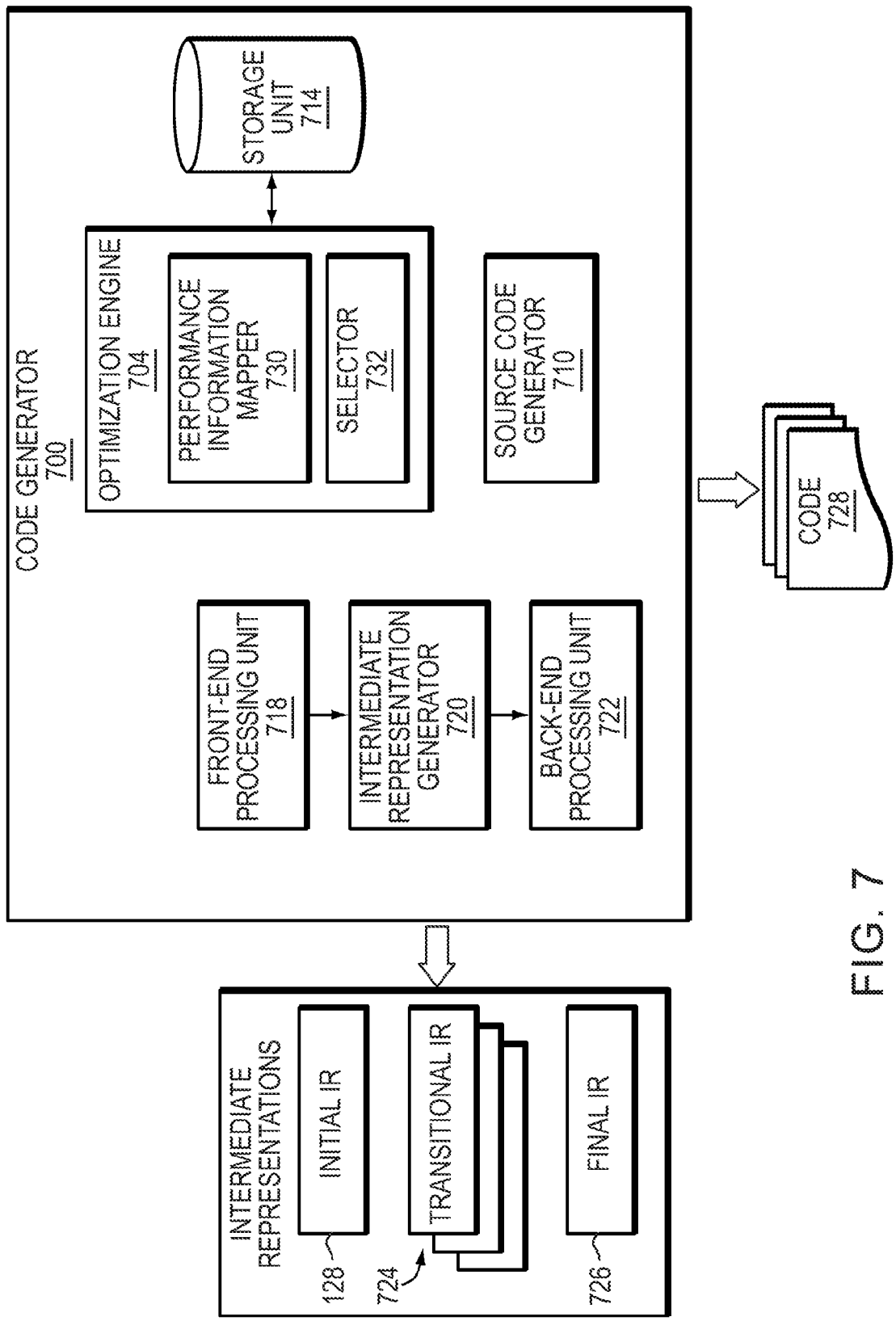
FIG. 7 is a schematic diagram of a code generator according to one or more embodiments.

FIG. 7 is a schematic diagram of the code generator 700. The code generator 700 may include an optimization engine 704 and a source code generator 710. The optimization engine 704 may include a performance information mapper 730 and a selector 732 that have access to a storage unit 714 that stores optimization techniques. The storage unit 714 may be implemented through one or more data structures, such as linked lists, tables, databases, etc., stored in a memory. The code generator 700 may further include a front-end processing unit 718, an intermediate representation (IR) generator 720, and a back-end processing unit 722. The IR generator 720 may be the same as the IR builder 126 of the model compiler 122, or it may be a different IR generator/builder. The IR generator 720 may construct or receive the initial IR 128 for the model 118. The IR generator 720 may apply one or more transforms to the initial IR 128, resulting in the generation of a plurality of transitional IRs, indicated generally at 724, and ending with a final IR 726, from which code 728 may be generated.

The code generator 700 may operate upon the model 118 created or identified by the user. The model 118, which may be referred to as a source model, may be a high-level functional or behavioral model, such as a Simulink model, a Stateflow chart, a LabVIEW block diagram, a VEE diagram, etc. The code generator 700 may produce code 728 corresponding to the model 118 that is optimized. In some embodiments, the code 728 may be source code, object code, or assembly code. The code may be C code, C++ code, HDL code, etc. Generated HDL code may be bit true and cycle accurate (modulo a well-defined initial latency) to the simulation of the model 118. Exemplary HDL code may include VHDL code, Verilog code, SystemC code, System Verilog code, embedded MATLAB code, vendor or target specific HDL code, such as Xilinx FPGA libraries, etc.

In an embodiment, the code generator 700 may be implemented through one or more software modules or libraries containing program instructions and data structures pertaining to the methods described herein. The software modules may be stored in one or more memories, such as a main memory, a persistent memory and/or on computer readable media, of a workstation or other data processing machine or device, and executed by one or more processing elements, such as a general purpose processor, a central processing unit, etc. Other computer readable media may also be used to store and execute these program instructions, such as non-transitory computer readable media, such as optical, magnetic, or magneto-optical media. In another embodiment, the code generator 700 may be implemented in hardware including registers and combinational logic configured and arranged to produce sequential logic circuits. In alternative embodiments, various combinations of software and hardware, including firmware, may be utilized to implement the embodiments.

It should be understood that FIGS. 1 and 7 are meant for illustrative purposes, and that the modeling environment 102 and/or the code generator 700 may be implemented in other ways. For example, the code generator 700, or one or more components thereof, may be separate from the modeling environment 102. In such cases, the code generator 700 may be in communication with the modeling environment 102 through local procedure calls (LPCs), remote procedure calls (RPCs), or one or more Application Programming Interfaces (APIs).

Suitable code generators for use with the embodiments herein include, but are not limited to, the Simulink Coder, the Embedded Coder, and the Simulink HDL Coder products from The MathWorks, Inc. of Natick, Mass., and the TargetLink product from dSpace GmbH of Paderborn Germany. Nonetheless, other code generation systems and other compilers may be used.

An executable model, such as the model 118, or a portion thereof may be received by or identified to the code generator 700. The code generator 700 also may receive one or more performance constraints for executing the model 118. Exemplary performance constraints may include availability of processing resources (such as, e.g., processor cores and threads), memory consumption, latency, area and/or power. The one or more hardware performance constraints may be user specified. For example, the UI engine 110 may present a GUI or CLI having one or more graphical affordances. A user may enter a desired hardware performance constraint through the one or more graphical affordances.

In some embodiments, the UI engine 110 may generate a user interface as part of a code generation process, such as a dialog, properties page or other GUI element, for presentation to the user, e.g., on a display of a computer processing device. The GUI element may include one or more controls through which the user can select or specify options, such as the identification of the model 118 or one or more subsystems or other portions of the model 118 for which code generation is to be performed, and the one or more performance constraints. For example, the GUI element may enable the user to select a number of processing cores and/or threads available for the execution of the model, such as the target or data processing system described herein. In response, the GUI element may present to the user tradeoffs (e.g., latency for higher throughput or throughput for lower latency) associated with the creation of a static execution schedule by the scheduling techniques according to various embodiments described herein. The GUI element also may include one or more command buttons through which the user can initiate code generation for the identified model or portion thereof.

It should be understood that the UI engine 110 may additionally or alternatively present a Command Line Interface (CLI) through which a user may identify the model 118 or portions thereof, specify the one or more performance constraints, and initiate the code generation process.

The code generator 700 may generate code 728 automatically for the identified model 118 or portions thereof. In an embodiment, several stages may be involved in generating code 728 for the model 118. For example, the front-end processing unit 718 may perform a number of preliminary tasks, such as analyzing the syntax and semantics of the model 118, error detection and reporting, capturing dataflow relationships, determining block semantics, such as the type of block, determining particular block and/or subsystem parameter settings, as established by the user, etc. This information may be provided by the front-end processing unit 718 to the Intermediate Representation (IR) generator 720.

The IR generator 720 may generate a series of in-memory representations or IRs of the source model 118. For example, the IR generator 720 may first construct the initial IR 128, which may closely correspond to the graphical (source) model 118. The transitional and final IRs 724 and 726, on the other hand, may have structures that differ, possibly significantly, from the structure of the source model 118, as a result of the transforms applied to the IRs. For example, the initial IR 128 may include a plurality of nodes interconnected by edges, and the nodes may correspond to blocks of the source model 118, and the edges may correspond to the signals of the source model 118. The IR generator 720 may then perform a series of transforms starting with the initial IR 128 and producing the plurality of transitional IRs 724 until the final IR 726 is produced. Exemplary transforms include unfolding transformations, loop scheduling transformations, and pipelining transformations. The particular transforms that are applied may start on the initial IR 128 and produce a final IR 726 suitable for code generation. That is, the final IR 726 is in a form and structure that is suitable for use in generating the code 728.

In some embodiments, one or more of the initial IR 128, the transitory IRs 724, and the final IR 726 may be graph-based, object-oriented structures. For example, one or more of the IRs may be in the form of a hierarchical, Data Flow Graph (DFG), which has a plurality of IR objects, including nodes interconnected by edges. The nodes of the DFG represent elements from the designated model 118 or portions thereof in an abstract manner. The edges of the DFG represent the connections between the elements of the model 118. In some embodiments, at least the initial IR 128 may have a plurality of hierarchically arranged levels. For example, the initial IR 128 may be a top-level of the in-memory representation of the source model 118, and one or more of the components of the initial IR 128 may be a particular type or form of in-memory representation. For example, one or more nodes of the initial IR 128 may be a Control Data Flow Graph (CDFG), that captures the control flow as well as the data flow of a graphical model through data dependency and control dependency edges. The initial IR 128 and the final IR 726 may be saved to memory, such as a main memory or a persistent memory of a computer processing device. One or more, or even all, of the transitional IRs 724 also may be saved in memory. Additionally or alternatively, one or more snapshots may be taken of the IR during the code generation process, including a snapshot of the version of the IR to which one or more optimizations are applied.

Target System

Figure 8:
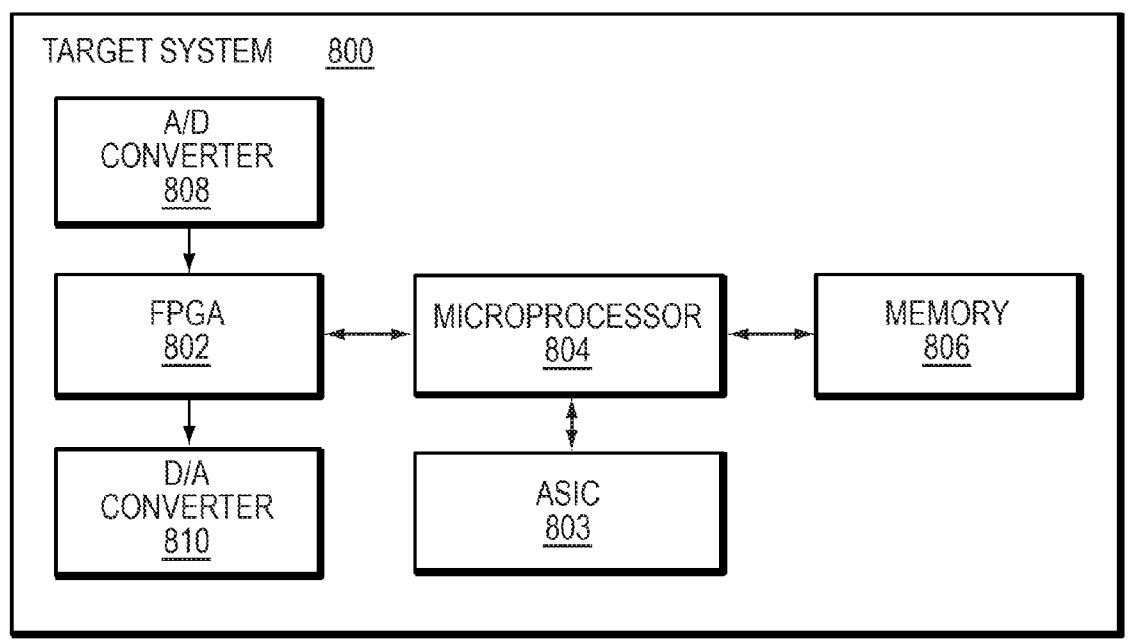
FIG. 8 is a schematic diagram of a target system according to one or more embodiments.

FIG. 8 is a schematic illustration of a target system 800 on which code generated for the DSP arrangement may be deployed in accordance with one or more embodiments described herein. The target system 800 may include one or more target hardware elements, such as an FPGA 802 and an ASIC 803. The target system 800 also may include one or more microprocessors 804, such as a Digital Signal Processor (DSP), and a memory 806. The memory 806 may include memory locations that are addressable by the microprocessors 804 for storing software programs and data structures associated with the embodiments described herein. The microprocessors 804 may include processing elements, such as processing cores, configured to execute the software programs, such as code 728 generated by code generator 700 of modeling environment 102, and manipulate the data structures. Illustratively, the code 728 may be implemented as a set of processes that may be decomposed into a plurality of threads and which are mapped to the processor cores for concurrent execution to achieve the overall improved performance of the target system 800 in accordance with the embodiments described herein.

The target system 800 may also include one or more analog components, such as an Analog-to-Digital (A/D) converter 808, and a Digital-to-Analog (D/A) converter 810.

The target system 800 of FIG. 8 is intended for illustrative purposes only, and the embodiments herein may be used with other target system designs. For example, the target system 800 may include one or more general-purpose processors in addition to or in place of the microprocessors 804, in which case the general-purpose processors include processing cores mapped to the threads. In addition, the target system 800 may include additional components, fewer components, or different components than those shown in FIG. 8. Moreover, the target system 800 may include components arranged in configurations that differ from the configuration of FIG. 8.

The foregoing description of embodiments is intended to provide illustration and description, but is not intended to be exhaustive or to limit the embodiments to the precise form disclosed. Modifications and variations are possible in light of the above teachings or may be acquired from a practice of the embodiments. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments. It will be apparent, however, that other variations and modifications may be made to the described embodiments, with the attainment of some or all of their advantages. For example, in addition to or instead of executable graphical models, the embodiments may be used with graphical models having executable semantics, such as models created using Architecture Analysis and Design Language (AADL), Uniform Modeling Language (UML), and/or SysML tools. In addition, the generated code may include fixed-point code to run on a fixed-point processor, or code to emulate fixed-point behavior on a floating-point processor. Therefore, it is the object of the appended claims to cover all such variations and modifications as come within the true spirit and scope of the embodiments.

What is claimed is:

1. A method comprising:
    receiving a dataflow graph (DFG) for concurrent execution on processing resources coupled to a memory of a data processing system, the DFG representing an executable model of a plurality of model elements corresponding to executable nodes;
    classifying each of the nodes based on a duration of an internal state of each of the nodes;
    identifying a first set of nodes as having an infinite duration of states;
    choosing a second set of nodes classified as having a finite duration of states, wherein the second set includes a plurality of the nodes;
    pipelining the second set of nodes into parallel branches of the DFG;
    merging each of the parallel branches of the DFG;
    unfolding the parallel branches of the second set of nodes according to an unfolding factor;
    loop scheduling the first set of nodes as additional parallel branches of pipelined nodes of the DFG such that samples produced and consumed by the first set of nodes are matched to the second set of nodes; and
    concurrently scheduling the first set of nodes and the second set of nodes of the DFG into pipeline stages on the processing resources.

2. The method of claim 1 wherein the DFG represents a digital signal processing (DSP) arrangement of filters, and the concurrently scheduling of the nodes produces a result equivalent to that as a sequential scheduling of the DSP arrangement of filters.

3. The method of claim 1 wherein the unfolding factor is computed as a ratio of a sum of execution times of the second set of nodes over an execution time of a node of the first set of nodes having a maximum execution time among all the first set of nodes.

4. The method of claim 1 wherein a number of loop schedules of the first set of nodes in the additional parallel branches of the DFG corresponds to the unfolding factor.

5. The method of claim 4 further comprising:
    partitioning a node when a parallel branch exceeds an execution time of a node of the first set of nodes having a maximum execution time among all the first set of nodes.

6. The method of claim 1 further comprising:
    inserting pipeline registers to coordinate results between the first set of nodes and the second set of nodes.

7. The method of claim 1 wherein the concurrently scheduling of the nodes comprises organizing the nodes as synchronized frames of the pipeline stages.

8. The method of claim 1 wherein the concurrently scheduling of the nodes comprises organizing the nodes asynchronously, and wherein each pipeline stage is started when results from a prior pipeline stage are available.

9. The method of claim 1 wherein the concurrently scheduling of nodes comprises executing the nodes in a simulation engine of a data processing system.

10. The method of claim 1 wherein the concurrently scheduling of nodes comprises executing the nodes in a code generator of a target system.

11. A non-transitory computer readable medium containing executable program instructions for execution by one or more processing resources, the program instructions when executed operable to:
    receive a dataflow graph (DFG) for concurrent execution on the one or more processing resources, the DFG representing an executable model of a plurality of model elements corresponding to executable nodes;
    classify each of the nodes based on a duration of an internal state of each of the nodes;
    identify a first set of nodes as having an infinite duration of states;

choose a second set of nodes classified as having a finite duration of states, wherein the second set includes a plurality of the nodes;

pipeline the second set of nodes into parallel branches of the DFG;

merge each of the parallel branches of the DFG;

unfold the parallel branches of the second set of nodes according to an unfolding factor;

loop schedule the first set of nodes as additional parallel branches of pipelined nodes of the DFG such that samples produced and consumed by the first set of nodes are matched to the second set of nodes; and concurrently schedule the first set of nodes and the second set of nodes of the DFG into pipeline stages on the one or more processing resources.

12. The non-transitory computer readable medium of claim 11 wherein the DFG graph represents a digital signal processing (DSP) arrangement of filters, and the concurrently scheduling of the nodes produces a result equivalent to that as a sequential scheduling of the DSP arrangement of filters.

13. The non-transitory computer readable medium of claim 11 wherein the unfolding factor is computed as a ratio of a sum of execution times of the second set of nodes over an execution time of a node of the first set of nodes having a maximum execution time among all the first set of nodes.

14. The non-transitory computer readable medium of claim 11 wherein a number of loop schedules of the first set of nodes in the additional parallel branches of the DFG corresponds to the unfolding factor.

15. The non-transitory computer readable medium of claim 14 wherein the program instructions when executed are further operable to:

partition a node when a parallel branch exceeds an execution time of a node of the first set of nodes having a maximum execution time among all the first set of nodes.

16. The non-transitory computer readable medium of claim 11 wherein the program instructions when executed are further operable to:

inserting pipeline registers to coordinate results between the first set of nodes and the second set of nodes.

17. The non-transitory computer readable medium of claim 11 wherein the concurrently scheduling of the nodes comprises organizing the nodes as synchronized frames of the pipeline stages.

18. The non-transitory computer readable medium of claim 11 wherein the concurrently scheduling of the nodes comprises organizing the nodes asynchronously, and wherein each pipeline stage is started when results from a prior pipeline stage are available.

19. The non-transitory computer readable medium of claim 11 wherein the concurrently scheduling of nodes comprises executing the nodes in a simulation engine of a data processing system.

20. A system comprising:

a data processing system including a memory configured to store program instructions; and one or more processing resources coupled to the memory, the one or more processing resources adapted to execute the program instructions, the program instructions when executed configured to:

receive a dataflow graph (DFG) for concurrent execution on the one or more processing resources, the DFG representing an executable model of a plurality of model elements corresponding to executable nodes;

classify each of the nodes based on a duration of an internal state of each of the nodes;

identify a first set of nodes as having an infinite duration of states;

choose a second set of nodes classified as having a finite duration of states, wherein the second set includes a plurality of the nodes;

pipeline the second set of nodes into parallel branches of the DFG;

merge each of the parallel branches of the DFG;

unfold the parallel branches of the second set of nodes according to an unfolding factor;

loop schedule the first set of nodes as additional parallel branches of pipelined nodes of the DFG such that samples produced and consumed by the first set of nodes are matched to the second set of nodes; and concurrently schedule the first set of nodes and the second set of nodes of the DFG into pipeline stages on the processing resources.

* * * * *

UNITED STATES PATENT AND TRADEMARK OFFICE
CERTIFICATE OF CORRECTION

PATENT NO. : 10,025,566 B1
APPLICATION NO. : 15/288367
DATED : July 17, 2018
INVENTOR(S) : Masud Ahmed et al.

It is certified that error appears in the above-identified patent and that said Letters Patent is hereby corrected as shown below:

In the Specification

Column 9, Line 6, reads:
"node ($T_R$ = max{exec_time($\theta$) |$\theta \in I$}). At step 612, additional"

Should read:
--node ($T_R$ = max{exec_time($\vartheta$) |$\vartheta \in I$}). At step 612, additional--

Signed and Sealed this
Fifth Day of November, 2019

Andrei Iancu
*Director of the United States Patent and Trademark Office*